Patented Jan. 11, 1949

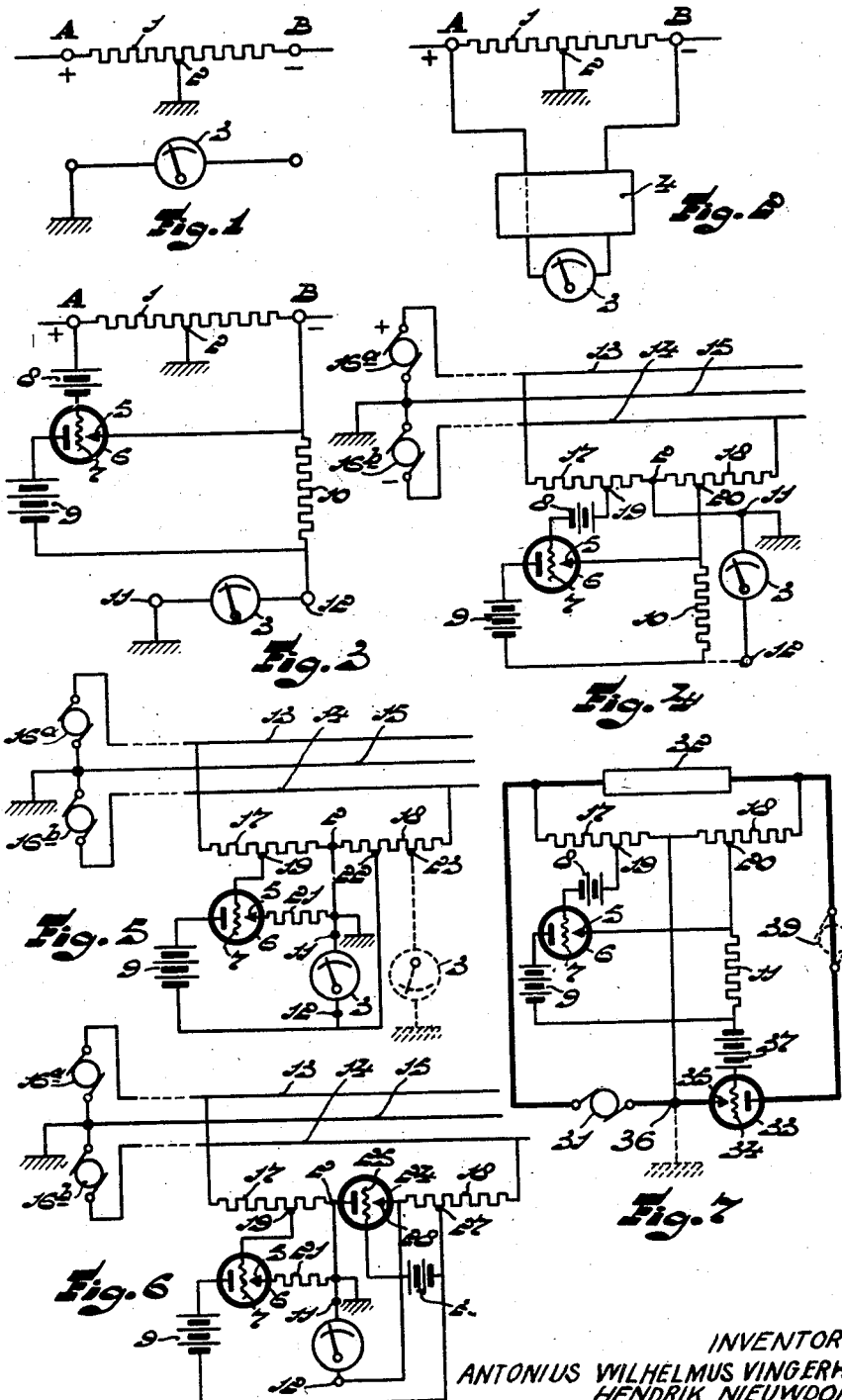

2,458,659

UNITED STATES PATENT OFFICE 2,458,659

DISCHARGE DEVICE FOR VOLTAGE MEASUREMENT

Antonius Wilhelmus Vingerhoets and Hendrik Nieuwdorp, Eindhoven, Netherlands, assignors, by mesne assignments, to Hartford National Bank and Trust Company, Hartford, Conn., as trustee Application April 27, 1946, Serial No. 665,392
In the Netherlands October 3, 1942

Section 1, Public Law 690, August 8, 1946
Patent expires October 3, 1962

5 Claims. (Cl. 171—95)

The present invention relates to direct-current voltage indicating arrangements.

When a voltage must be indicated, one sometimes encounters the difficulty that the input terminals of the indicating device cannot be connected directly to the terminals between which prevails the voltage to be measured, since one of the two input terminals is connected to an intermediate point which exhibits potential differences relative to the two terminals of the voltage to be measured.

This difficulty becomes manifest, for example, when one of the terminals of a voltmeter is connected to ground and it is intended to use this meter to measure a source of supply whose electrical centre is connected to ground. In the case of alternating voltage this object may be achieved by utilising a separating transformer, but in the case of direct current other means must be found.

As a matter of fact, in measuring direct voltage use is made of a direct-current amplifier, but in this case also the same difficulty is experienced, since the input circuit and the output circuit of such amplifiers have a common connecting terminal.

The present invention relates to a device for indicating direct voltage, in which this difficulty has been solved. In this device the grid and the cathode of an amplifying tube (high-vacuum discharge tube having a control electrode) are connected to points between which prevails a potential difference dependent on the voltage to be indicated. The anode circuit of this amplifying tube comprises an element having transferred to it the variations in the voltage to be indicated. Said element is connected to that terminal of the meter which is not connected to the intermediate point, in such manner that this element is thus also included in the external circuit connecting the two input terminals of the meter. The latter is therefore not in series with the said element in the anode circuit of the amplifying tube, but the anode circuit and the external circuit of the meter, possess a common element, at which variations in voltage occur which are equal or proportional to the variations in the voltage to be measured or controlled.

In order that the invention may be more clearly understood and readily carried into effect, it will be described more fully by reference to the accompanying drawing.

Figures 1 and 2 of this drawing serve to explain the problem solved by the invention, the other Figures 3 to 7 showing circuit diagrams of constructional examples of the device according to the invention.

Figure 1 shows a simple circuit-diagram comprising an impedance 1 traversed by direct current, so that the terminals A and B exhibit a potential difference V. An intermediate point 2 of the impedance is connected to ground and exhibits potential differences $V_a$ and $V_b$ relative to terminals A and B. The problem consists in measuring the voltage V with the aid of a voltmeter 3, of which one of the input terminals is grounded, so that this terminal is exectively connected to intermediate point 2. The grounded input terminal of the voltmeter cannot be connected directly to one of the terminals of the voltage to be measured, since in this case the part of the impedance between the terminal considered and intermediate point 2 would be short-circuited. Consequently, only one of the voltages $V_a$ and $V_b$ can be measured directly and for measuring the total voltage V, which is the algebraic sum of the voltages $V_a$ and $V_b$, the indication of the measuring instrument can only be utilised, if it is certain that the voltage $V_a$ is always equal to the voltage $V_b$ or at least proportional thereto. That such is not always the case will appear from the examples explained hereinafter.

If, as is shown in Figure 2, there is placed between the voltmeter 3 and the terminals of the voltage to be measured a direct-current amplifier 4, comprising a high-vacuum discharge tube having a control electrode and associated circuit elements, it is not possible for one of the terminals of the measuring instrument 3 to be also connected to ground, since in such amplifiers one of the input terminals is connected directly to one of the output terminals, as is indicated by a dotted line, due to the cathode being included in both the grid circuit and the anode circuit.

It can be seen from Figure 3 how this difficulty may be solved by the invention. The incandescent cathode 5 of an amplifying tube 6 is here connected to the negative terminal B of the voltage to be measured, grid 7 of this tube being connected to the positive terminal A through a source of bias voltage 8. Consequently, the grid and the cathode are connected to points between which prevails a potential difference dependent on the voltage to be measured, which in this case is equal to the voltage to be measured itself.

The anode circuit of the tube comprises a source of supply 9 and a resistance 10. The anode current varies as a function of the grid voltage so that the voltage drop in resistance 10 varies according to the anode current. Resistance 10 consequently constitutes an element of the anode circuit which has transferred to it the variations in the voltage to be measured. Terminal 11 of the voltmeter 3 is connected to ground, i. e. to intermediate point 2. Terminal 12, which is not connected to this point, is connected to one end of element 10 included in the anode circuit of the tube, in such manner that it is thus also included in the external circuit connecting the two input terminals 11 and 12 of the voltmeter 3. This circuit extends from terminal 11 via the grounded connection to the intermediate point 2 and thence via the part of impedance 1 between the fixed point 2 and the negative terminal B and further via resistance 10 to terminal 12.

As a result applied to meter 3 is the sum of two voltages, viz. the voltage drop in resistance 10, which comprises the variations in the voltage V to be measured, and the voltage $V_b$. Consequently, the variations in the voltage $V_b$ are once again supplied to the meter 3. Apparently the device does not therefore satisfy the requirement imposed. The error in the indication brought about by the direct action of the voltage between terminal B and the intermediate point 2 on meter 3 is, however, negligible, since the amplification of tube 6 is preferably so great that the variations in the voltage $V_b$ which are supplied directly are negligible relatively to those derived from resistance 10. With a hundredfold amplification, for example, there will be obtained in most cases a sufficient approximation of the ideal condition. In many cases a comparatively low amplification will be sufficient.

Due to this amplification, the voltage which is set up at meter 3 and the voltage which must be supplied by the source 9 might in certain cases become too high for practical use. From Figure 4 it will be seen, how this drawback may be avoided in a simple manner.

In this figure 13, 14 and 15 are the current conductors of three-wire mains for direct current, which are supplied by two series-connected generators 16a and 16b, whose mutual connection is conected to ground. Conductor 15 is the middle conductor, 13 is the positive and 14 the negative conductor. The task consists in measuring the voltage between conductors 13 and 14 in a point far remote from the point of supply with the aid of a measuring instrument of which one of the two input terminals is grounded. It is then not sufficient to measure the voltage of but one of the conductors relatively to earth, since due to leakage and irregular load the voltages which the conducors 13 and 14 exhibit relative to ground are not always equal or proportionally varying, even if this were the case with the terminal voltages of the dynamos 15 and 16. If, now, the full variations in voltage, which may be, for example, 20% of the nominal value of the mains voltage, are set up at the grid of the amplifying tube and these variations after a hundredfold amplification are transferred to the measuring instrument, the latter is suitable for a voltage which must be at least twenty times as great as the mains voltage. It is evident that this is in many cases objectionable, but the difficulty can be easily obviated by deriving the control voltage from potentiometers, i. e. from a potentiometer 17 for the positive terminal, which connects conductor 13 to ground, and from a potentiometer 18 for the negative terminal, which connects conductor 14 to ground. As before, we have an intermediate point 2 which exhibits the potential differences $V_a$ and $V_b$ relative to the terminals of the voltage to be measured and which is connected to one of the supply terminals of the voltmeter 3. The grid and the cathode of amplifying tube 6 are now not connected to conductors 13 and 14, but are connected to taps 19 and 20 of the potentiometers, which are chosen such that their potential differences relatively to the intermediate point 2 are in the same relation to the voltages $V_a$ and $V_b$. The circuit is otherwise identical with that of Figure 3.

Figure 5 shows another possibility of construction of the device according to the invention, in which the drawback of too high a voltage at the measuring instrument is also avoided. In this construction, like in that of Figure 4, the terminals of the voltage to be measured are connected to the intermediate point 2 through potentiometers. As before, the grid of amplifying tube 6 is connected to a tap 19 of the potentiometer for the positive terminal, but instead of being connected, like in Figure 4, to a point of the potentiometer for the negative terminal, the cathode is now connected via a resistance 21 to the intermediate point 2. The source 9 of anode supply is connected to a tap of the potentiometer for the negative terminal, the tap 22. Consequently, the part $r_b$ of potentiometer 18 between intermediate point 2 and tap 22 is included in the anode circuit of the amplifying tube. As before, terminal 11 of the measuring instrument 3 is connected to ground, i. e. to the intermediate point 2, and terminal 12 is connected to point 22. In this case part $r_b$ of potentiometer 18 constitutes the common part element of the anode and of the external circuit of the meter 3 to which the variations in the voltage to be measured are transferred. The variations in the voltage $V_a$ are derived from the part $r_a$ of potentiometer 17, located between tap 19 and intermediate point 2, and transferred to grid 7 of tube 6. The variations in control voltage bring about variations in the anode current, which in turn bring about corresponding variations in the potential drop across resistance $r_b$ traversed by anode current. This voltage drop comprises, in addition, the variations in the voltage $V_b$. Both variations are thus added in this resistance and with a suitable choice of resistance 21 and of taps 19 and 22 the total variations in voltage across resistance $r_b$ which act upon the measuring instrument are proportional to those of the total voltage V. This may be proved as follows. If resistance 21 has a value $r_c$, the anode current $i_c$ of amplifying tube 6 produces in this resistance a voltage drop $i_c.r_c$. The current $i_a$ in potentiometer 17 produces across part $r_a$ a voltage drop $i_a.r_a$. Consequently, the grid voltage of tube 6 is composed of a positive component $i_a.r_a$ and a negative component $i_c.r_c$.

The anode current of tube 6 will now adjust itself in such manner that $i_c.r_c$ becomes approximately equal to $i_a.r_a$. The resistances may be easily chosen such that the resulting grid voltage is low relatively to the product $i_a.r_a$. For simplicity's sake it is assumed that $r_c$ is equal to $r_a$, then $i_c$ becomes equal to $i_a$. The current $i_c$ produces in resistance $r_b$ a voltage drop $i_c.r_b=i_a.r_b$. This resistance is traversed, in addition, by a current $i_b$ supplied by the voltage $V_b$. Consequently, the voltage drop $v_b$ in resistance $r_b$ is $$v_b=i_a.r_b+i_b.r_b$$

Let the resistance of potentiometer 17 be $R_a$ and that of potentiometer 18 be $R_b$, then $$V_b=i_b.R_b+i_a.r_b$$

so that $$i_b=\frac{V_b}{R_b}-\frac{i_a.r_b}{R_b}$$

or, as $$i_a=\frac{V_a}{R_a}$$

$$i_b=\frac{V_b}{R_b}-\frac{i_a.r_b}{R_aR_b}$$

Consequently, for $v_b$ we may substitute $$v_b=\frac{V_a}{R_a}.r_b-\frac{V_a.r_b^2}{R_a.R_b}+\frac{V_b}{R_b}.r_b$$

If we choose $$R_a=R_b=R_1$$

then $$v_b\frac{r_b}{R}\left(V-V_a\frac{r_b}{R}\right)$$

Since, as a rule, R will be very high relative to $r_b$, the term with the minus sign is negligible relatively to V, so that the variations in the voltage drop across resistance $r_b$, which are supplied to the measuring instrument 3, are indeed proportional to those of the voltage V to be measured between the conductors 13 and 14.

If the variations of $V_a$ are transferred to resistance $r_b$ to a percentage larger than that of the variations of $V_b$, it is nevertheless possible to obtain a correct indication by connecting terminal 12 of the measuring instrument to potentiometer 18 not in the same point as the negative terminal of the source of supply 9, but, as is shown by dotted lines in Figure 5, in another tap 23. The farther tap 23 is removed from the intermediate point 2, the greater becomes the influence exerted by the voltage $V_b$ on the indication of the measuring instrument.

That in the device of Figure 5 only a definite percentage of the voltage variations are transferred to the measuring instrument may in several cases lead to extension of this device by a second amplifying tube. A very simple manner of providing the latter consists in placing this tube between the two potentiometers in series with the first amplifying tube. The anode of the second tube 24, as it appears from Figure 6, is then connected to the intermediate point 2. Grid 25 of tube 24 is connected, via a bias battery 26, to a tap 27 of the potentiometer 18 for the negative terminal. The cathode of tube 24 and terminal 12 of voltmeter 3 are connected to one end of potentiometer 18. The element of the anode circuit of the first amplifying tube 7, which is also included in the external circuit connecting the two input terminals of the voltmeter 3, is in this case not an ordinary resistance, but discharge tube 24.

Figure 7 shows an example of a device according to the invention for controlling instead of measuring a voltage, so that this voltage either varies in a definite manner or remains constant. a control tube is provided, viz. a high-vacuum discharge tube having a control electrode, which is connected in series with a load whose voltage must be modulated, and this in such manner that the potential of the cathode differs from that of the negative terminal of the load. For this circuit the invention is of particular importance, since the difficulties described in the preamble cannot be avoided by a symmetrical arrangement of the auxiliary device and, in addition, the control tube itself is included in the circuit and takes up a considerable variable voltage, so that it is out of the question whether $V_a$ and $V_b$ must remain equal or proportional.

In Figure 7 a source of supply 31 supplies a load 32 through a triode 33. The input terminals of the auxiliary device for the control of the voltage at the load are in this case connected to grid 34 and to incandescent cathode 35 of triode 33. Cathode 35 is connected to the negative terminal 36 of the source of supply, i. e. to a point which exhibits potential differences $V_a$ and $V_b$ relative to terminals A and B of the voltage to be controlled. $V_a$ is in this case the terminal voltage of the source of supply 31 and $V_b$ the voltage drop across control triode 33. The intermediate point is here the negative terminal 36 of the source of supply 31.

A potentiometer 17 is provided for the positive terminal A and a potentiometer 18 for the negative terminal B of the voltage to be controlled. An amplifying tube 6 is connected to these potentiometers in a manner similar to that of Figure 4. That supply terminal of the auxiliary device which is not connected to the intermediate point 36, i. e. grid 34, is connected to resistance 11 through a source of bias 37 in such manner that this resistance is thus included, in the same manner as in Figure 4, in the external circuit connecting the two supply terminals of the auxiliary device.

The voltages $v_a$ and $v_b$, of which the algebraic sum constitutes the positive component of the grid voltage of tube 6, are here of opposite signs and the positive component is consequently equal to the difference of the absolute values of $v_a$ and $v_b$.

The same circuit may be utilised if an electromotive force is also active at the anode side of the control tube. The source of supply may be constituted, for example, by two series-connected generators 31 and 39, the latter of which is indicated by dotted lines in Figure 7. In certain cases this circuit may be preferable to that comprising a control tube which is connected directly to the load. Thus, it may be desirable for cathode 35 to be grounded, while it causes difficulty to ground one of the terminals of the load or one of the terminals of the source of supply, for example because the other terminal cannot withstand the full voltage of the load or of the source of supply relative to ground. In this case triode 33 is placed between the two parts of the source of supply. The grounding of cathode 35 is illustrated by a dotted line in Fig. 7.

The circuit shown in Fig. 7 may serve to control or to maintain constant of a high voltage, for example the voltage of an X-ray tube or of a device for testing insulators. By utilising a source of supply 37 having a variable electromotive force, it is possible to vary the voltage V that prevails between the terminals A and B. The latter voltage is within wide limits proportional to the voltage of source 37, independent of the voltage of the generator 31 or of the generators 31 and 39. If the source 37 supplies a constant voltage, the voltage V remains constant, even if the voltage of the source of supply varies. This is of importance, if the source of supply used is a condenser or a battery of condensers.

The circuit shown in Figures 5 and 6 may also be used in connection with a control device as shown in Fig. 7.

The invention may alternatively be applied for controlling a voltage by means of other auxiliary devices, such as electromagnetically operating control devices, of which one of the terminals is connected by grounding or in another manner to a point which always exhibits a definite potential difference relatively to terminal A as well as terminal B.

What we claim is:

1. Apparatus for indicating the voltage established across the output of a direct-current source by means of a voltage indicator one of whose input terminals is connected to an intermediate point in said source, said apparatus comprising an electron discharge device having a cathode, a control grid and an anode, said cathode and said grid being connected to two points in said source between which exists a potential difference proportional to the output voltage of said source, a resistance element, an anode voltage supply connected to said anode and through said resistance element to said cathode, and means connecting the other input terminal of the indicator to a point in said resistance element.

2. Apparatus for indicating the voltage established across the output leads of a direct-current source by means of a voltage indicator, one of whose input terminals is connected to an intermediate point in said source, said apparatus comprising an electron discharge tube having a cathode, a control grid and an anode, a bias voltage supply, said cathode being connected to the negative lead of said source, said grid being connected through said bias voltage supply to the positive lead of said source, a resistance, an anode voltage supply connected to said anode and through said resistance to said cathode, and means connecting the other input terminal of said indicator to the junction of said anode voltage supply and said resistance.

3. Apparatus for indicating the voltage established between the output leads of a direct-current source by means of a voltage indicator one of whose input terminals is connected to an intermediate point in said source, said apparatus comprising a first potentiometer having a tap and being connected between the negative output terminal of the source and the intermediate point, a second potentiometer having a tap and being connected between the positive terminal of the source and the intermediate point, an electron discharge device having a cathode, a control grid, and an anode, said cathode being connected to the tap of said first potentiometer and said grid being connected to the tap of said second potentiometer, a resistance, an anode voltage supply connected between said anode and through said resistance to said cathode, and means connecting the other input terminal of said indicator to the junction of said supply and said resistance.

4. Apparatus for indicating the voltage established between the output terminals of a direct-current source by means of a voltage indicator one of whose input terminals is connected to an intermediate point in said source, said apparatus comprising a first potentiometer having a tap and being connected between the negative lead of the source and the intermediate point, a second potentiometer having a tap and being connected between the positive lead of the source and the intermediate point, an electron discharge device having a cathode, a control grid and an anode, said grid being connected to the tap of said second potentiometer, a resistance connected between the intermediate point and said cathode, an anode voltage supply connected between said anode and the tap of said first potentiometer, and means connecting the other input terminal of the voltage indicator to the tap of said first potentiometer.

5. Apparatus for indicating the voltage established between the output leads of a direct current source by means of a voltage indicator one of whose input terminals is connected to an intermediate point in said source, said apparatus comprising a first potentiometer having a tap and being connected between the negative lead of the source and the intermediate point, a second potentiometer having a tap and being connected between the positive lead of the source and the intermediate point, the said first and second potentiometers being of equal value, an electron discharge device having a cathode, a control grid and an anode, said grid being connected to the tap of said second potentiometer, a resistance connected between the intermediate point and said cathode, the value of said resistance being equal to the resistance existing between the tap of said first potentiometer and the intermediate point, an anode voltage supply connected between said anode and the tap of said first potentiometer, and means connecting the other input terminal of the voltage indicator to the tap of said first potentiometer.

ANTONIUS WILHELMUS VINGERHOETS.
HENDRIK NIEUWDORP.

REFERENCES CITED

The following references are of record in the file of this patent:

UNITED STATES PATENTS

| Number | Name | Date |
|---|---|---|
| 2,360,523 | Simmons | Oct. 7, 1944 |
| 2,364,687 | Banker | Dec. 12, 1944 |